March 15, 1960 H. W. SLATER ET AL 2,928,512
STRUCTURAL ASSEMBLIES
Filed Nov. 14, 1956
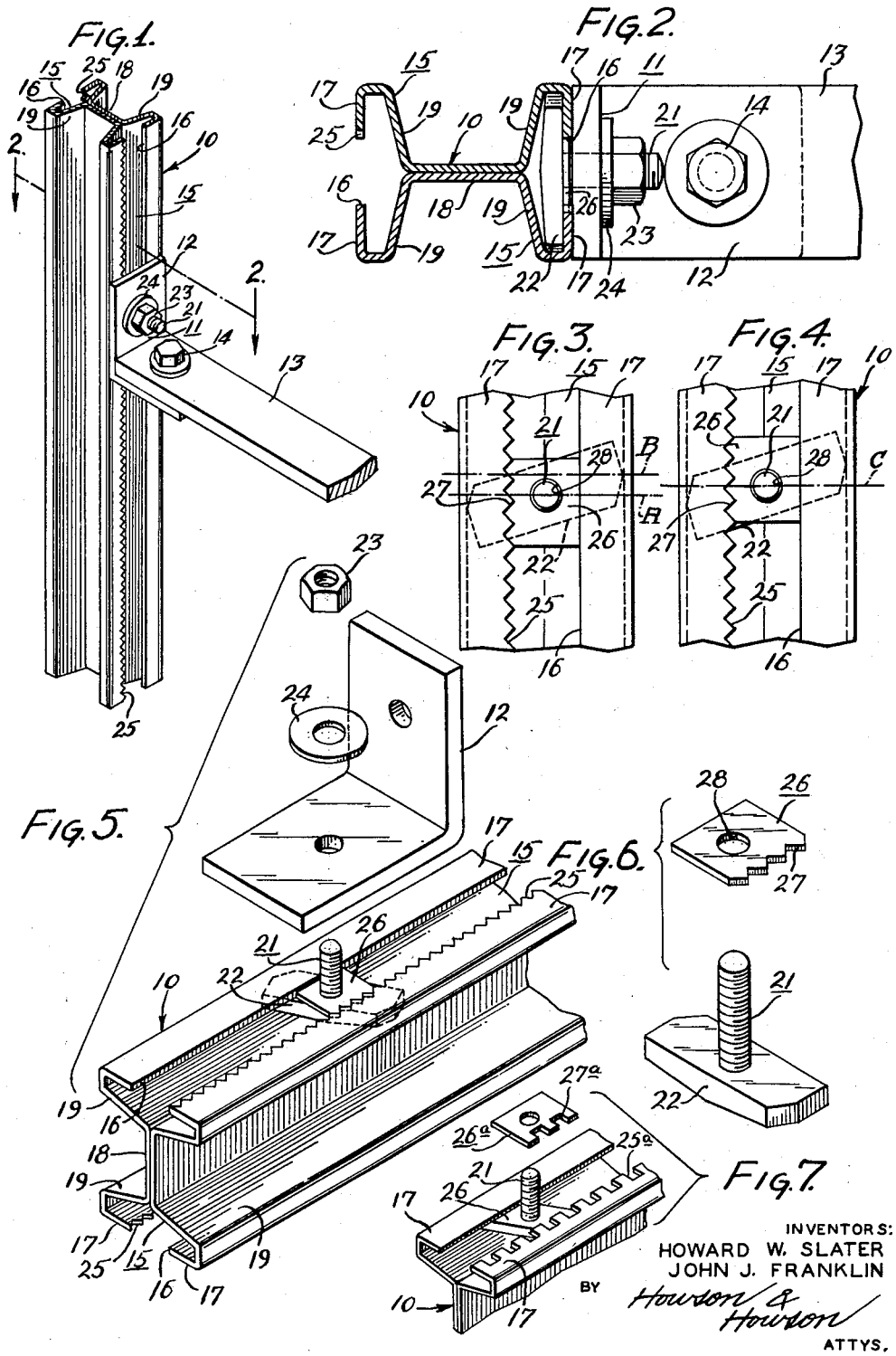
INVENTORS:
HOWARD W. SLATER
JOHN J. FRANKLIN
BY Howson & Howson
ATTYS.

2,928,512
Patented Mar. 15, 1960

United States Patent Office

2,928,512
STRUCTURAL ASSEMBLIES

Howard W. Slater, Philadelphia, and John J. Franklin, Glenside, Pa., assignors to Proctor & Schwartz, Inc., Philadelphia, Pa., a corporation of Pennsylvania Application November 14, 1956, Serial No. 622,034

2 Claims. (Cl. 189—36)

The present invention relates to new and useful improvements in structural assemblies and more particularly to new and useful improvements in a structural member and a fastening member wherein the fastening member may be positively interlocked with the structural member at any position along the entire length of the structural member to secure a member to the structural member.

The present invention is particularly directed to a structural assembly comprising a structural member having an elongated channel extending the full length thereof within which a fastening member is engaged, means being provided to permit interlocking of the fastening member with the structural member at any desired position along the length of the channel to prevent relative movement between the two members. In prior structural members of this type having elongated channels adapted to receive a fastening element there are no positive locking means provided and the fastening element, in attempting to resist a force in the longitudinal direction of the structural member, will easily slip or be displaced longitudinally of the structural member. This drawback of prior structural assemblies of this type is eliminated in the present invention by providing a generally rectangular washer element carried by the fastening member having a serrated or toothed edge which fits in the channel opening and is operable to engage teeth formed integrally with the structural member to thereby positively lock the fastening member in position.

With the foregoing in mind the principal object of the present invention is to provide a novel structural assembly of the above mentioned type wherein the fastening member may be positively interlocked with a structural member to prevent relative movement between the parts.

Another object of the present invention is to provide a novel structural assembly as set forth wherein means are provided to positively interlock the fastening member with a srtuctural member at any desired position along the entire length of the structural member.

A further object of the present invention is to provide a novel structural assembly having the features and characteristics set forth which is of relatively simplified construction, is highly efficient and effective in operation and use, and may be manufactured easily and cheaply.

These and other objects of the present invention and the various features and details of the operation and construction thereof are hereinafter more fully set forth and described with reference to the accompanying drawing, in which:

Fig. 1 is a perspective view of a structural assembly formed in accordance with the present invention;

Fig. 2 is an enlarged transverse sectional view taken on line 2—2, Fig. 1, illustrating the relation of the fastening member to the structural member in the assembled positions;

Fig. 3 and Fig. 4 are fragmentary front elevational views of a structural member having the fastening member of the present invention positioned thereon, illustrating the adjustability of the fastening member relative to the structural member;

Fig. 5 is an exploded perspective view of a structural assembly of the present invention;

Fig. 6 is a perspective view of the fastening member and serrated washer element of the present invention; and Fig. 7 is a fragmentary perspective view illustrating a modified form of the present invention.

Referring more specifically to the drawings and particularly Fig. 1 thereof, the structural assembly of the present invention comprises an elongated structural member 10 and fastening means designated generally as 11, the fastening means being operable to secure a member in a fixed position relative to the structural member. In the present instance the fastening means is shown as securing a bracket 12 to the structural member 10 and a brace or other supporting number 13 is fastened to the bracket 12 for example by means of a bolt 14.

In accordance with the present invention the structural member 10 has elongated channels 15, 15 at its opposite sides which extend longitudinally of the structural member for the entire length thereof. The channels 15, 15 each have an opening 16 in one face of the side wall of the structural member extending the full length of the structural member. The opening 16 is bounded at its opposite sides by a pair of flanges 17, 17 extending inwardly from the side walls of the structural member toward one another and lying in a common plane.

The structural member itself may have any desired cross sectional configuration and all that is necessary is that a channel 15 be provided in at least one side thereof and preferably on two opposing sides with an elongated slot-like opening permitting access to the channel and extending substantially the full length of the structural member. In the present instance the structural member 10 is similar to the structural member disclosed in the now abandoned application of John R. Thygeson, et al., Serial Number 223,840, filed April 30, 1951, and comprises a central web portion 18 with outwardly diverging wall portions 19, 19 at opposite sides thereof terminating in the inwardly extending flange portion 17, 17 defining the channels 15.

An important feature of the present invention is the provision of locking means which interlocks with the structural member and engages a member carried by the structural member, for example the supporting bracket 12 to prevent any possibility of longitudinal movement of the supporting bracket 12 relative to the structural member. To this end the fastening means 11 comprises a bolt 21 having an elongated head portion 22 thereon which is adapted to pass through the slot 16 and be received within the channel 15 of the structural member 10. The head portion 22 of the bolt is longer than the width of the channel 15 and accordingly engages the opposite sides of the channel 15, for example as illustrated in Figs. 3 and 4, to prevent rotary movement of the bolt with respect to the structural member. The threaded portion of the bolt extends outwardly beyond the structural member 10 and passes through an opening in the supporting bracket 12. A nut and washer 23 and 24 respectively are secured to the threaded portion of the bolt 21 and secure the bracket 12 to the structural member.

To prevent longitudinal movement of the bolt 21 and the support bracket 12 relative to the structural member 10, one side edge of the slot 16 is serrated or has a plurality of tooth-like projections 25 extending the full length thereof. In addition, a washer member 26 is positioned over the threaded portion of the bolt and has a serrated or toothed edge portion 27 thereon adapted to mesh with the toothed portion 25 of the slot 16. As illustrated in Figs. 3 and 4 the washer 26 is of substantially the same width as the slot 16 and fits snugly into the slot 16 with the toothed portions 25 and 27 of the slot and washer respectively, in engagement with each other. By this construction there is a positive interlock between the fastening means and the structural member which prevents movement of a supporting bracket or other member engaged by the fastening means relative to the structural member.

Fig. 7 discloses a modified form of apparatus for preventing longitudinal movement of the bolt 21 relative to the structural member 10. In this modification, the washer 26a has a plurality of rectangular teeth 27a thereon adapted to engage similar teeth 25a formed on one of the flanges 17 of the structural member. This form provides a more positive interlock between the fastening means and the structural member.

Another important feature of the present invention is the positioning of the center line of the opening 28 of the washer 26 relative to the teeth of the washer to permit the maximum adjustability of a member longitudinally of the structural member. To accomplish this the horizontal center line of the washer opening 28 is positioned so that it passes through the tooth portion midway between the tooth and the tip of a tooth, for example, as indicated by the broken line A in Fig. 3. With the washer in the position as shown in Fig. 3 it may be raised a distance equal to the pitch of one tooth, for example to the position indicated by the broken line B in Fig. 3, or it may be raised or lowered a distance equal to any multiple of the pitch of the tooth portion of the washer. However, with the horizontal center line of the washer opening 28 in the position described the washer may be turned over, for example as illustrated in Fig. 4, and thus the center line of the washer will be in the position indicated by the broken line C in Fig. 4. With this positioning of the washer opening relative to the teeth the washer may not only be raised and lowered a distance equal to the pitch of a tooth of any multiple of the pitch of a tooth but it may also be raised and lowered a distance equal to any multiple of one-half of the pitch of the tooth, thereby permitting a greater adjustability of a member supported by the fastening means longitudinally of the structural member 10.

From the foregoing it will be apparent that the present invention provides a novel structural assembly wherein a fastening member securing a part to a structural member may be positively interlocked with the structural member to prevent relative movement of the part relative to the structural member. In addition it will be apparent that the present invention provides a novel structural assembly which is of relatively simplified construction and very versatile in use and wherein the fastening member may be secured to the structural member at any desired point along the entire length of the structural member.

While particular embodiments of the present invention have been illustrated and described herein it is not intended to limit the invention to such a disclosure and changes and modifications may be incorporated and embodied therein within the scope of the following claims.

We claim:

1. A structural assembly to support an article in a fixed position, comprising: an elongated structural member having a channel extending the full length thereof, means defining a slot opening to said channel, one edge of said slot opening having teeth thereon, a toothed member within said slot in engagement with said slot teeth, a fastening member engaged within said channel projecting outwardly therefrom into engagement with said article to support said article, and means defining an opening in said toothed member to receive said fastening member, the center of said opening being positioned on a line normal to said teeth with said line passing through one tooth at the midpoint between the high point of said tooth and one of the adjoining low points of said tooth whereby turning said toothed member will move the center of said opening relative to said structural member.

2. A structural assembly to support an article in a fixed position, comprising: an elongated structural member having a channel extending the full length thereof, a pair of oppositely disposed flange portions on said structural member extending inwardly toward each other and lying in a common plane, the terminal edges of said flanges spaced apart from one another and defining a slot opening to said channel for the full length thereof, one of said flanges having teeth formed on the terminal edge thereof, a threaded bolt having an elongated head portion of greater length than the width of the channel and of lesser width than the width of said slot opening positioned within the channel in engagement with the side walls and flange portions thereof to prevent rotary movement of the threaded bolt with respect to the structural member, the threaded portion of said bolt extending outwardly from said channel to secure the article to said structural member, and a washer element carried by said bolt positioned within said slot opening engaging the opposite sides of said slot opening with one edge of said washer element having teeth thereon engaging the teeth of said structural member flange and operable to prevent movement of the bolt and the article longitudinally relative to said structural member, said washer element having means defining an opening therein through which the threaded portion of said fastening member passes, the center of said opening being positioned on a line normal to said teeth with said line passing through one tooth at the midpoint between the high point of said tooth and one of the adjoining low points of said tooth whereby turning said washer member over will move the center of said opening relative to said structural member.

References Cited in the file of this patent

UNITED STATES PATENTS

| | | |
|---|---|---|
| 909,769 | Downing et al. | Jan. 12, 1909 |
| 2,163,446 | Heckman | June 20, 1939 |
| 2,767,609 | Cousino | Oct. 23, 1956 |
| 2,784,812 | Kindorf | Mar. 12, 1957 |